United States Patent
Kim et al.

(10) Patent No.: US 7,776,472 B2
(45) Date of Patent: Aug. 17, 2010

(54) ANODE MATERIAL FOR SECONDARY BATTERY, METHOD FOR PRODUCING THE SAME AND SECONDARY BATTERIES USING THE SAME

(75) Inventors: Ho-Gun Kim, Seoul (KR); Jong-Sung Kim, Gyeonggi-do (KR); Dong-Hun Shin, Gyeonggi-do (KR); Chul Youm, Gyeonggi-do (KR); Jeong-Hun Oh, Gyeonggi-do (KR)

(73) Assignee: LS Mitron Ltd., Anyang (KR)

( * ) Notice: Subject to any disclaimer, the term of this patent is extended or adjusted under 35 U.S.C. 154(b) by 789 days.

(21) Appl. No.: 11/653,330

(22) Filed: Jan. 12, 2007

(65) Prior Publication Data

US 2007/0166616 A1    Jul. 19, 2007

(30) Foreign Application Priority Data

Jan. 16, 2006    (KR) .................. 10-2006-0004415

(51) Int. Cl.
  *H01M 4/58*    (2010.01)
  *H01M 4/88*    (2006.01)
  *H01B 1/04*    (2006.01)

(52) U.S. Cl. ................. 429/218.1; 252/182.1; 252/502; 427/122

(58) Field of Classification Search ............... 252/182.1
  See application file for complete search history.

(56) References Cited

U.S. PATENT DOCUMENTS

| 5,576,121 | A | * | 11/1996 | Yamada et al. ............ 429/220 |
| 6,027,833 | A | * | 2/2000 | Ueda et al. ............ 429/218.1 |
| 2001/0003362 | A1 | | 6/2001 | Sano |
| 2002/0009646 | A1 | | 1/2002 | Matsubara |
| 2002/0182495 | A1 | | 12/2002 | Ogura |
| 2004/0101756 | A1 | | 5/2004 | Koyama |
| 2006/0286459 | A1 | | 12/2006 | Zhao |

FOREIGN PATENT DOCUMENTS

| CN | 1261729 A | 8/2000 |
| CN | 1218418 C | 9/2005 |
| EP | 0555080 | 5/1996 |
| JP | 2000-090925 | 3/2000 |
| JP | 2002-042887 | 2/2002 |
| JP | 2003-168429 | 6/2003 |
| JP | 2005-019399 | 1/2005 |
| KR | 2004-44095 | 5/2004 |
| KR | 10-2004-57416 A | 7/2004 |
| KR | 2005-44770 | 5/2005 |
| KR | 10-2005-94061 | 6/2005 |
| WO | WO 2005/067081 | 7/2005 |

OTHER PUBLICATIONS

Kuribayashi et al. Battery characteristics with varous carbonaceous materials, 1995, Journal of Power Sources, vol. 54, pp. 1-5.*
Office action issued Apr. 26, 2010 in U.S. Appl. No. 11/651,361.
Wen-Sheng Song, et al., "Relations beetween crystallinity and electric performance of carbon anode materials for Li-ion battery,:" Chinese Journal of Power Sources, vol. 26, No. 6, pp. 428-430, Dec. 2002.

* cited by examiner

*Primary Examiner*—Dah-Wei D Yuan
*Assistant Examiner*—Maria J Laios
(74) *Attorney, Agent, or Firm*—Jones Day

(57) ABSTRACT

Disclosed are an anode material for a secondary battery, a method for producing the same and a secondary battery using the same. The present invention provides the anode material for a secondary battery produced by coating a high-crystallinity core carbonaceous material with a coating carbonaceous material and calcinating the high-crystallinity core carbonaceous material, wherein the anode material has a specific volume of 0.002 cc/g or less. The anode material for a secondary battery of the present invention may be produced by coating a high-crystallinity core carbonaceous material with a coating carbonaceous material and undergoing a predetermined calcination process, and the anode material can have an increased volume ratio of the micropores. Accordingly, the secondary battery of the present invention may be useful to improve charging/discharging capacity and efficiency since sorption of lithium ion in the anode material is improved.

20 Claims, 2 Drawing Sheets

ANODE MATERIAL FOR SECONDARY BATTERY, METHOD FOR PRODUCING THE SAME AND SECONDARY BATTERIES USING THE SAME

BACKGROUND OF THE INVENTION

1. Field of the Invention

The present invention relates to an anode material for a secondary battery, a method for producing the same and a secondary battery using the same, and more particularly to an anode material for a secondary battery capable of being used for a secondary battery producing process, which may improve a discharging capacity and a charging/discharging efficiency of battery by adjusting an amount of micropores inside the secondary battery, wherein the anode material for a secondary battery is produced by coating a high-crystallinity core carbonaceous material with a coating carbonaceous material and calcinating the high-crystallinity core carbonaceous material, a method for producing the same and a secondary battery using the same.

2. Description of the Related Art

Recently, there have been increasing demands for a small-sized and lightweight secondary battery having a relatively high capacity, and this trend has been accelerated as electronic apparatuses using a battery, for example portable phones, portable notebook computers, electric vehicles, etc., comes into wide use.

A high charging/discharging efficiency may be accomplished by a lithium ion secondary battery using a metal lithium as an anode material of the secondary battery, but the lithium ion secondary battery has a disadvantage that an internal short circuit may be caused since dendrite is formed while depositing a lithium ion onto a surface of the metal lithium upon charging. Due to the disadvantage, there has been proposed an alternative technology in which lithium alloys such as a lithium/aluminum alloy are used instead of the lithium metal. However, the lithium alloy have a disadvantage that a stable electrical property is not ensured if an alloy is used for an extended time due to segregation of the alloy caused when charge/discharge cycles are repeated for a long time. Meanwhile, a carbonaceous material having a high degree of carbonization was known as a promising material having an excellent charge/discharge cycle characteristic and a high stability of a battery since the carbonaceous material has a high charging/discharging efficiency, and a small voltage change upon discharging. However, the carbonaceous materials, including materials from graphite to amorphous carbon, have various structures and shapes, and therefore there have been proposed various shapes of carbonaceous materials having different properties according to physical properties or various microstructures of carbon since an electrode performance of the battery depends on the different physical properties and the various microstructures of the carbon. A lithium anode material for a secondary battery, used in recent years, includes carbon-based materials calcinated at approximately 1,000° C., and graphite-based materials calcinated at approximately 2,800° C. If the carbon-based materials are used as an anode material, the carbon-based materials have an advantage that an electrolyte is not dissolved due to a low reactivity to the electrolyte, while the carbon-based materials have a disadvantage that their potential changes are increased due to emission of lithium ions. Meanwhile, the graphite-based materials have an advantage that their potential changes are small due to emission of lithium ions, while the carbon-based materials have a disadvantage that they react to an electrolyte to dissolve the electrolyte, which may further destroy the electrode materials. As a result, a charging/discharging efficiency and a cycle characteristic of the battery are deteriorated, and a stability of the battery is damaged.

In order to solve the above-mentioned problems, there has been proposed a method for modifying a surface of a carbonaceous material, and as a result it was found that the surface-modified carbonaceous material having certain physical properties has an increased battery capacity and an improved cycle characteristics since reaction of the carbonaceous material with the electrolyte is inhibited. Accordingly, there have been attempts to develop a carbonaceous material capable of being used as an anode material of the secondary battery which can ensure an optimal battery characteristic, and the present invention was designed based on the above-mentioned facts.

SUMMARY OF THE INVENTION

The present invention is designed to solve the problems of the prior art, and therefore it is an object of the present invention to provide an anode material for a secondary battery capable of solving various problems of the carbonaceous material used as the above-mentioned anode material of conventional secondary batteries, for example preventing an electrolyte from being dissolved when the anode material reacts to the electrolyte, and therefore preventing a battery characteristic from being deteriorated by the dissolution of the electrolyte, a method for producing the same and a secondary battery using the same.

In order to accomplish the above object, the present invention provides an anode material for a secondary battery produced by coating a high-crystallinity core carbonaceous material with a coating carbonaceous material and calcinating the high-crystallinity core carbonaceous material, wherein the total pore of the anode material for a secondary battery has a specific volume of 0.002 cc/g or less, and a volume of pores (micropores) having a diameter of less than 40 nm is 10% or more of the total pore volume and a volume of pores (micropores) having a diameter of 40 to 180 nm is 90% or less of the total pore volume.

The coating carbonaceous material preferably accounts for 5% by weight or more, based on the total weight of the mixture of the core carbonaceous material and the coating carbonaceous material. The anode material for a secondary battery preferably has a tap density of 1.0 g/cm$^3$ or more. The anode material for a secondary battery preferably has a BET specific surface area of 4 m$^2$/g or less. The high-crystallinity core carbonaceous material is preferably natural graphite. The natural graphite is preferably spheroidized natural graphite and has a tap density of 0.8 g/cm$^3$ or more. The coating carbonaceous material preferably has a softening temperature of 100° C. or more.

In order to accomplish the above object, the present invention provides a secondary battery using, as a battery anode, the anode material for a secondary battery so as to meet the above-mentioned requirements. The anode material of the secondary battery preferably has a discharging capacity of 340 mAh/g or more and a charging/discharging efficiency of 90% or more.

In order to accomplish the above object, the present invention provides a method for producing an anode material for a secondary battery, including: (S1) preparing a core carbonaceous material having a tap density of 0.8 g/cm$^3$ or more and a content of 95% by weight or less, and a coating carbonaceous material having a softening temperature of 100° C. above and a content of 5% by weight or more; (S2) mixing the materials by means of wet stirring to obtain a mixture in which the core carbonaceous material is coated with the coating carbonaceous material; and (S3) calcinating the mixture to obtain an anode material in which the core carbonaceous material is coated with the coating carbonaceous material, wherein the total pores in the anode material for a secondary battery have a specific volume of 0.002 cc/g or less, and a volume of pores (micropores) having a diameter of less than 40 nm is 10% or more of the total pore volume and a volume of pores (micropores) having a diameter of 40 to 180 nm is 90% or less of the total pore volume.

At this time, the core carbonaceous material of the step (S1) is preferably natural graphite. The calcination of the step (S3) is preferably carried out at a temperature of 1,000 to 2,500° C., and the calcination is preferably sequentially carried out under different temperature conditions, and the calcination sequentially carried out under the different temperature conditions is particularly preferably carried out at a relatively higher calcination temperature in the latter step than in the former step. The temperature should be maintained within the range since the anode material for a secondary battery may not have desired physical properties if the calcination temperature is out of the range.

BRIEF DESCRIPTION OF THE DRAWINGS

Other objects and aspects of the present invention will become apparent from the following description of embodiments with reference to the accompanying drawings. However, it should be understood that the description proposed herein is just a preferable example for the purpose of illustrations only, not intended to limit the scope of the invention. In the drawings.

DESCRIPTION OF THE PREFERRED EMBODIMENT

Figure 1:
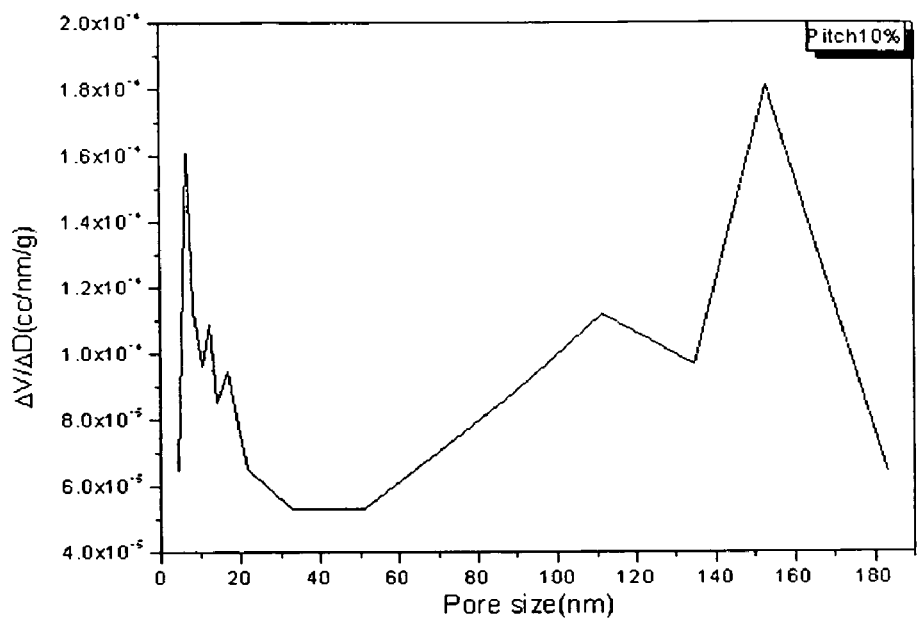
FIG. 1 is a diagram showing a profile for a volume-to-pore size distribution of an anode material made of a composition of Embodiment 1 according to the present invention.

Hereinafter, preferred embodiments of the present invention will be described in detail referring to the accompanying drawings. However, the description proposed herein is just a preferable example for the purpose of illustrations only, not intended to limit the scope of the invention, so it should be understood that other equivalents and modifications could be made thereto without departing from the spirit and scope of the invention. The preferred embodiments of the present invention will be described in detail for the purpose of better understandings, as apparent to those skilled in the art.

Embodiments 1 and 2 and Comparative Examples 1 and 2

The carbonaceous materials, classified into Embodiments 1 and 2 and Comparative examples 1 and 2, were used as the anode material, as listed in the following Table 1. Also, a weight ratio of a carbonaceous material to a pitch dissolved in tetrahydrofuran (THF) is determined as listed in the following Table 1. The other items were determined according to a method as described later on the basis of Embodiment 1 to produce electrodes, respectively.

TABLE 1

| | Embodiments | | Comparative examples | |
|---|---|---|---|---|
| | 1 | 2 | 1 | 2 |
| | Kind of Carbonaceous Material | | | |
| | Spherical Graphite-based Carbonaceous Material | Spherical Graphite-based Carbonaceous Material | Spherical Graphite-based Carbonaceous Material | Natural Graphite-based Carbon with less Spheroidization Behavior |
| Tap density of Carbonaceous Material (g/cm$^3$) | 0.92 | 0.92 | 0.92 | 0.76 |
| Softening Temperature of Pitch (° C.) | 275 | 275 | — | — |
| Carbonaceous Material:Pitch (Weight Ratio) | 9:1 | 9.5:0.5 | 10:0 | 10:0 |

Production of Battery using Anode Material

In order to evaluate a battery characteristic of the anode material for a secondary battery according to the present invention, an electrode was produced by sequentially carrying out steps (S1) to (S5) in a process for producing an electrode using the anode material for a secondary battery according to the present invention, as follows.

Preparation of Material (S1)

All of synthetic graphite and natural graphite may be used for the core carbonaceous material, but the natural graphite is more preferably used herein. In the case of the natural graphite, it is preferred to prepare processed natural graphite with a tap density of 0.8 g/cm$^3$ or more after undergoing a spheroidization step. A pitch, used as the coating material, preferably has a softening temperature of 100° C. or above. A coating level of the pitch may be suitably controlled due to a small degradation of the pitch upon calcination since a carbonization yield or a carbon content in the pitch is increased as the softening temperature increases, and the pitch more preferably has a softening temperature of 100 to 400° C. In order to obtain an effective coating level, the coating carbonaceous material is preferably used at an amount of 5% by weight or more, more preferably 5 to 30% by weight on the basis of the total weight of the crystalline core carbonaceous material and the coating carbonaceous material. If the coating carbonaceous material is used at an amount of 30% by weight or more, a pulverization process may be required after the calcination, and it is also difficult to control a coating level.

Coating Step (S2)

A mixture in which the core carbonaceous material is coated with the coating carbonaceous material was obtained by mixing the prepared materials by means of wet stirring. More particularly, a core carbonaceous material composed of high-crystallinity graphite is preferably added to the prepared coating carbonaceous material, wet-stirred at a room temperature for 2 hours, and then dried at 80 to 150° C. while stirring for 4 hours under a reduced pressure.

Calcination Step (S3)

The coated mixture was sequentially calcinated firstly at 1,100° C. for 1 hour, and secondarily at 1,500° C. for 1 hour. The calcination of the coated mixture is preferably carried out at a temperature of 1,000° C. or above for 1 to 24 hours. If the calcination temperature is lower than 1,000° C. it is difficult to control a coating level due to an insufficient carbonization degree of the pitch. Preferably, the calcination temperature ranges from 1,000 to 2,500° C. The calcination may be carried out in one step or several steps, but carried out with various patterns within the suitable range to control a desirable coating level. The calcination is preferably sequentially carried out under different conditions, and particularly the next step preferably has a higher calcination temperature than that of the previous step. After the 2-step calcination procedure, the calcinated materials are preferably distributed to remove a fine powder, thereby to obtain an anode material for a secondary battery.

Kneading Step (S4)

100 g of the fine powder-free mixture was added to a 500 ml vial, and kneaded with a small amount of N-methylpyrrolidone (NMP).

Electrode Production Step (S5)

The kneaded mixture was pressed on a copper mesh, and then dried to produce an electrode, which may later be used for a battery. Subsequently, a mixed solution of ethylene carbonate and diethyl carbonate having a volume ratio of 1:1, dissolved in 1 mol/L $LiPF_6$, was used as the electrolyte solution.

The anode materials for a secondary battery of Embodiments 1 and 2 and Comparative examples 1 and 2 were measured for various physical properties, for example a specific surface area, a tap density, and battery characteristics (discharging capacity and charging/discharging efficiency), as follows. Meanwhile, the measured results are listed in the following Table 2. The anode materials for a secondary battery were measured for pore volume-related physical properties, for example a pore volume ratio and a total pore volume, and the results are also listed in the following Table 2.

Measurement of Specific Surface Area

The battery has a high specific surface area if natural graphite is used as a material of a core carbon, and a specific surface area of the battery tends to decrease if micropores of the core carbon are closed due to attachment or coating of the carbon derived from the pitch, etc.

A specific surface area analyzer (Brunauer-Emmett-Teller, hereinafter referred to as "BET") is an apparatus for measuring a specific surface area of powder, or sizes and a size distribution of pores present in porous mass, and may calculate a surface area and a pore size according to a BET equation, represented by the following Equation 1, by measuring an amount of nitrogen gas adsorbed to a surface and pores of a test material.

$$q = \frac{V_m A_m C}{(C_s - C)[1 + (A_m - 1)(C/C_S)]} \quad \text{Equation 1}$$

wherein, "q" represents an amount of adsorbed nitrogen gas;

$V_m$ and $A_m$ represent constant values, respectively;

"C" represents an equilibrium concentration; and

"Cs" represents a saturation concentration.

Meanwhile, a test material was determined for a specific surface area using an ASAP 2400 specific surface area analyzer (Micrometrics, Norcross, Ga.) in the present invention.

An anode material used for the secondary battery preferably has a BET specific surface area of 4 $m^2/g$ or less. If the BET specific surface area exceeds 4 $m^2/g$, an available capacity of the secondary battery is decreased due to its increased irreversible capacity.

Measurement of Tap Density

A tap density of a carbonaceous material is related to diameter, shape, surface or the like of a carbonaceous material powder, and therefore the tap density may be varied according to a particle size distribution of the carbonaceous material even if particles of the carbonaceous material have the same mean diameter. Generally, the tap density is increased if the particles are coated, but not increased if a large amount of scale-shaped or fine particles is present. Since the graphite used in the present invention has a high tap density if the particle is ground into powder as fine as possible, an apparent density may be enhanced by facilitating penetration of the electrolyte solution into the pores.

A tap density is referred to as a value obtained by stirring a cell, tapped with a test sample, under a predetermined condition, followed by measuring a density of the sample. In the present invention, the tap density was measured according to a JIS-K5101 method, as follows. Firstly, a powder tester PT-R (Hosokawa Micron) was used herein, and a particle size of a test sample was adjusted with a sieve having a scale interval of 200 μm. A 20 cc tapping cell was fully filled with a test sample, graphite powder, by dropping the graphite powder into the cell, and the tapping cell was tapped 3,000 times with a tapping distance of 18 mm while applying a tapping vibration once per second, and then a tap density was measured. Meanwhile, the anode material used for the secondary battery has a reduced capacity if it has a tap density of 0.7 $g/cm^3$ or less. Meanwhile, the anode material used for the secondary battery according to the present invention has high discharging capacity and efficiency since it has a tap density of 1.0 $g/cm^3$ or more. On the while, the anode material used for the secondary battery according to the present invention has a reduced capacity if it has a tap density of 1.0 $g/cm^3$ or less.

Measurement of Pore Volume (Pore Volume Ratio and Total Pore Volume)

A pore volume was measured using Quantachrome's Autosorb-1, and then a BET plot was obtained by attaching nitrogen gas at a liquid nitrogen temperature. The resultant plot profile was analyzed using a Horvat-Kawazoe equation to measure total pore volumes in an anode material of the pore, and a volume ratio of the pore having a predetermined diameter, respectively. The results are listed in the following Table 2, and it is depicted oil the drawings in more for better understanding.

Figure 2:
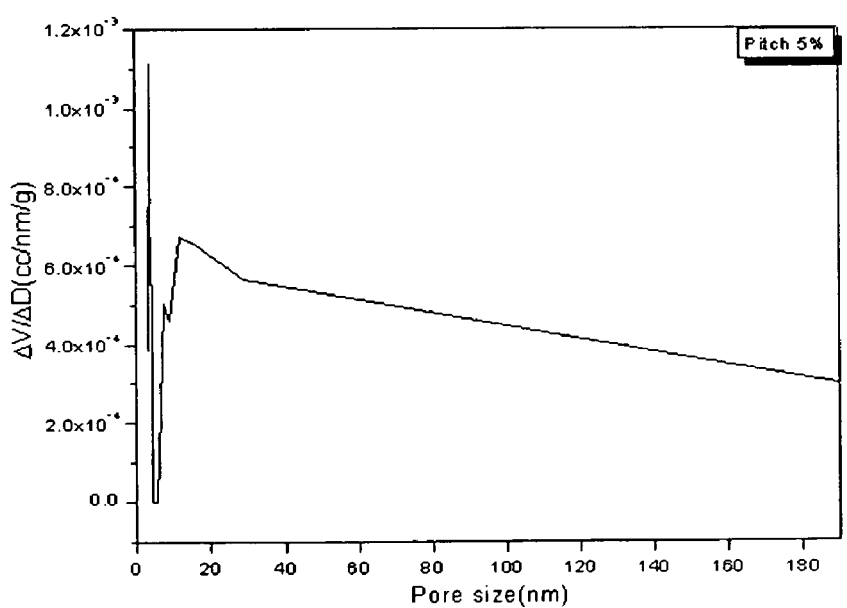
FIG. 2 is a diagram showing a profile for a volume-to-pore size distribution of an anode material made of a composition of Embodiment 2 according to the present invention.
Figure 3:
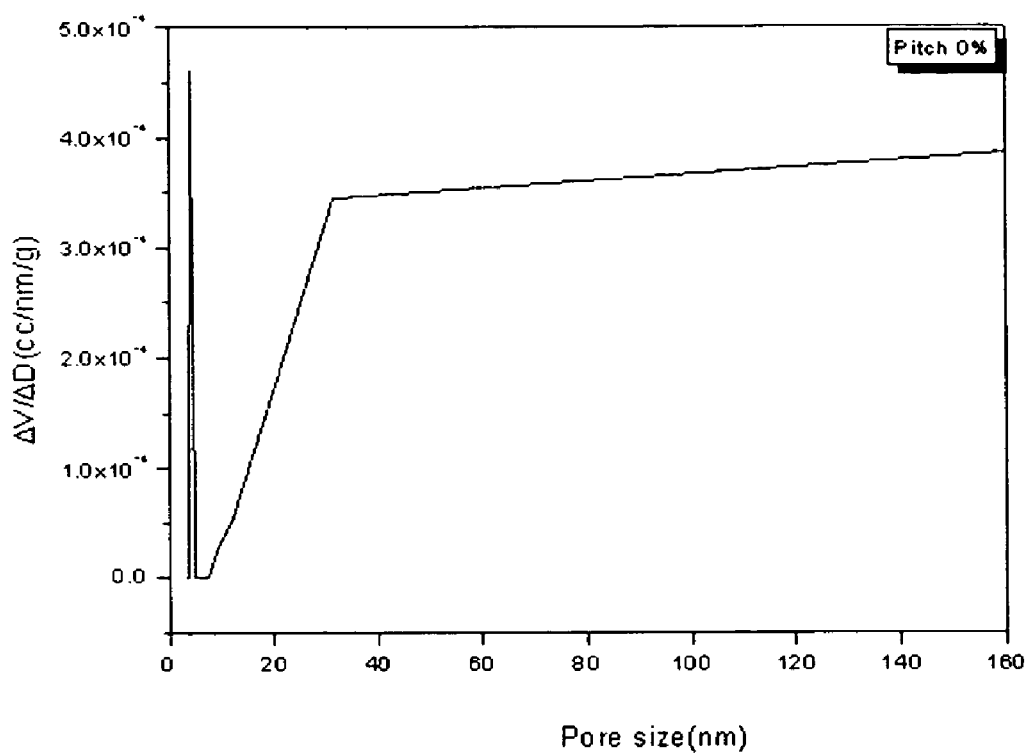
FIG. 3 is a diagram showing a profile for a volume-to-pore size distribution of an anode material made of a composition of Comparative example 1 corresponding to the embodiments of the present invention.

FIG. 1 is a diagram showing a profile for a volume-to-pore size distribution of an anode material made of a composition of Embodiment 1 according to the present invention, and FIG. 2 is a diagram showing a profile for a volume-to-pore size distribution of an anode material made of a composition of Embodiment 2 according to the present invention. A diagram of Comparative example 1 to be compared with Embodiments 1 and 2 is shown in FIG. 3. FIG. 3 is a diagram showing a profile for a volume-to-pore size distribution of an anode material made of a composition of Comparative example 1 corresponding to the embodiments of the present invention.

then discharged with a discharging current of 0.5 mA/cm² to a voltage of 1.5 V. In the following Table 2, the charging/discharging efficiency represents a ratio of a discharged electrical capacity to a charged electrical capacity. Meanwhile, the secondary battery preferably has a discharging capacity of 340 mAh/g or more and a charging/discharging efficiency of 90% or more.

TABLE 2

|  |  | Embodiments | | Comparative Examples | |
|---|---|---|---|---|---|
|  |  | 1 | 2 | 1 | 2 |
| Specific Surface Area (m²/g) | | 1.6 | 1.8 | 7.5 | 8.7 |
| Tap Density (g/cm³) | | 1.10 | 1.05 | 0.92 | 0.76 |
| 40 nm or less | Volume (cc/g) | 0.00029 | 0.000156 | 0.00067 | 0.00085 |
|  | Volume Ratio | 17 | 13 | 9.1 | 9.2 |
| 40~180 nm | Volume (cc/g) | 0.00141 | 0.001044 | 0.00063 | 0.000835 |
|  | Volume Ratio | 83 | 87 | 91.9 | 91.8 |
| Total Volume (cc/g) | | 0.0017 | 0.0012 | 0.0073 | 0.0092 |
| Discharging Capacity (mAh/g) | | 348.2 | 342.5 | 330.4 | 321.7 |
| Charging/Discharging Efficiency (%) | | 94.2 | 94.5 | 81.2 | 77.4 |

The term "total pore volume" in the present invention is referred to as a volume obtained by integrating a pore diameter of 180 nm or less in the profile graph obtained as described above. The above-mentioned pore volume exhibits inherent physical properties of the anode material, depending on kinds of the anode materials, coating condition and temperature.

As shown in FIG. 1 and FIG. 2, if the carbonaceous material was coated with a pitch, the total volume of the pores formed in a surface of the anode material was reduced, and therefore physical properties of the anode material may be improved since it is possible to adjust the total volume of the pores. In addition, it was seen that the anode material for a battery includes pores having various diameters, and a charging/discharging capacity and a charging/discharging efficiency of the battery may be improved as a volume ratio of micropores having a diameter of 40 nm or more and a volume ratio of micropores having a diameter of less than 40 nm are varied. That is, battery characteristics are improved since an ability for the anode material made of the carbonaceous material to occlude lithium ions is improved as the volume of the micropores increases. Meanwhile, a charging/discharging efficiency of the secondary battery may be deteriorated if a volume of the pores having a diameter of less than 40 nm is 10% or less of the total pore volume and a volume of the pores having a diameter of 40 to 180 nm is 90% or more, as shown in FIG. 3 for the Comparative example 1.

Measurement of Battery Characteristics (Discharging Capacity and Charging/Discharging Efficiency)

A charge/discharge test of the spherical graphite-based carbonaceous material, coated with the pitch, was carried out with limiting an electric potential to a range of 0 to 1.5 V, that is, a secondary battery was charged with a charging current of 0.5 mA/cm² to a voltage of 0.01 V, and then continued to be charged to a charging current of 0.02 mA/cm² while maintaining the voltage of 0.01 V. And, the secondary battery was As seen in Table 2, it was revealed that all of the measured values of the physical properties are more excellent in Embodiments 1 and 2 than in Comparative examples 1 and 2. In particular, it was seen that a volume of the pores having a diameter of less than 40 nm was measured to be 10% or more of the total pore volume and a volume of the pores having a diameter of 40 to 180 nm was measured to be 90% or less of the total pore volume, regarding the pore volume ratios in the Embodiments 1 and 2. As described above, the charging/discharging capacity and the charging/discharging efficiency of the battery are improved since an ability for the anode material made of the carbonaceous material to occlude lithium ions is improved as the volume of the micropore increases.

As described above, the best embodiments of the present invention are disclosed. Therefore, the specific terms are used in the specification and appended claims, but it should be understood that the description proposed herein is just a preferable example for the purpose of illustrations only, not intended to limit the scope of the invention.

APPLICABILITY TO THE INDUSTRY

As described above, it was revealed that the anode material for a secondary battery according to the present invention can be produced by coating a high-crystallinity core carbonaceous material with a coating carbonaceous material and undergoing a predetermined calcination process, and the produced anode material can have an increased volume ratio of the micropores. Accordingly, if a battery is made of the anode material for a secondary battery, the secondary battery of the present invention may be useful to improve a charging/discharging capacity and a charging/discharging efficiency since sorption of lithium ion is improved in the anode material.

What is claimed is:

1. An anode material for a secondary battery produced by coating a high-crystallinity core carbonaceous material with a coating carbonaceous material and calcinating the high-crystallinity core carbonaceous material,
wherein total pores of the anode material for a secondary battery have a specific volume of 0.002 cc/g or less, and a volume of pores (micropores) having a diameter of less than 40 nm is 10% or more of the total pore volume and a volume of pores (micropores) having a diameter of 40 to 180 nm is 90% or less of the total pore volume.

2. The anode material for a secondary battery according to claim 1,
wherein the coating carbonaceous material, used for coating the core carbonaceous material, accounts for 5% by weight or more before the calcination.

3. The anode material for a secondary battery according to claim 1,
wherein the anode material for a secondary battery has a tap density of 1.0 g/cm³ or more.

4. The anode material for a secondary battery according to claim 1,
wherein the anode material for a secondary battery has a BET specific surface area of 4 m²/g or less.

5. The anode material for a secondary battery according to claim 1,
wherein the high-crystallinity core carbonaceous material is natural graphite.

6. The anode material for a secondary battery according to claim 5,
wherein the natural graphite is spheroidized natural graphite, and has a tap density of 0.8 g/cm³ or above.

7. The anode material for a secondary battery according to claim 1,
wherein the coating carbonaceous material has a softening temperature of 100° C. or more.

8. A secondary battery produced by using, as a battery anode, an anode material for a secondary battery produced by coating a high-crystallinity core carbonaceous material with a coating carbonaceous material and calcinating the high-crystallinity core carbonaceous material,
wherein total pores of the anode material for a secondary battery have a specific volume of 0.002 cc/g or less, and a volume of pores (micropores) having a diameter of less than 40 nm is 10% or more of the total pore volume and a volume of pores (micropores) having a diameter of 40 to 180 nm is 90% or less of the total pore volume.

9. The secondary battery according to claim 8,
wherein the coating carbonaceous material, used for coating the core carbonaceous material, accounts for 5% by weight or more before the calcination.

10. The secondary battery according to claim 8,
wherein the anode material for a secondary battery has a tap density of 1.0 g/cm³ or more.

11. The secondary battery according to claim 8,
wherein the anode material for a secondary battery has a BET specific surface area of 4 m²/g or less.

12. The secondary battery according to claim 8,
wherein the high-crystallinity core carbonaceous material is natural graphite.

13. The secondary battery according to claim 12,
wherein the natural graphite is spheroidized natural graphite, and has a tap density of 0.8 g/cm³ or above.

14. The secondary battery according to claim 8,
wherein the coating carbonaceous material has a softening temperature of 100° C. or more.

15. The secondary battery according to claim 8,
wherein the anode material for a secondary battery has a discharging capacity of 340 mAh/g or more and a charging/discharging efficiency of 90% or more.

16. A method for producing an anode material for a secondary battery, comprising:
(S1) preparing a core carbonaceous material having a tap density of 0.8 g/cm³ or more and a content of 95% by weight or less, and a coating carbonaceous material having a softening temperature of 100° C. or above and a content of 5% by weight or more;
(S2) mixing the materials by means of wet stirring to obtain a mixture in which the core carbonaceous material is coated with the coating carbonaceous material; and
(S3) calcinating the mixture to obtain an anode material in which the core carbonaceous material is coated with the coating carbonaceous material,
wherein total pores in the anode material for a secondary battery have a specific volume of 0.002 cc/g or less, and a volume of pores (micropores) having a diameter of less than 40 nm is 10% or more of the total pore volume and a volume of pores (micropores) having a diameter of 40 to 180 nm is 90% or less of the total pore volume.

17. The method for producing an anode material for a secondary battery according to claim 16,
wherein the core carbonaceous material of the step (S1) is natural graphite.

18. The method for producing an anode material for a secondary battery according to claim 16,
wherein the calcination of the step (S3) is carried out at a temperature of 1,000 to 2,500° C.

19. The method for producing an anode material for a secondary battery according to claim 16,
wherein the calcination of the step (S3) is sequentially carried out under different temperature conditions.

20. The method for producing an anode material for a secondary battery according to claim 19,
wherein the calcination, sequentially carried out under the different temperature conditions, is carried out at a relatively higher calcination temperature in the latter step than in the former step.

* * * * *